United States Patent [19]

Schmader et al.

[11] Patent Number: 5,217,207
[45] Date of Patent: Jun. 8, 1993

[54] APPARATUS FOR AERIAL INSTALLATION OF CABLE IN INTERDUCT

[76] Inventors: George J. Schmader, 16540 NE. Fargo Cir., Portland, Oreg. 97230; Ralph C. Langston, 13588 SE. 152nd Ave., Clackamas, Oreg. 97015

[21] Appl. No.: 774,543

[22] Filed: Oct. 10, 1991

[51] Int. Cl.⁵ .............................. B65H 59/00
[52] U.S. Cl. .................. 254/134.3 R; 254/134.3 PA; 254/134.3 CL
[58] Field of Search ............. 254/134.3 R, 134.3 PA, 254/134.3 CL; 174/40 R, 43, 45 R, 88 R

[56] References Cited

U.S. PATENT DOCUMENTS

| | | |
|---|---|---|
| 3,739,075 | 6/1973 | Jean et al. ............... 254/134.3 PA |
| 4,019,715 | 4/1977 | Vugrek .................... 254/134.3 R |
| 4,312,495 | 1/1982 | Dunbar .................... 254/134.3 PA |
| 4,576,362 | 3/1986 | Langston. |
| 4,669,705 | 6/1987 | Langston. |
| 4,717,122 | 1/1988 | Ikeya et al. ............... 254/134.3 R |
| 4,757,976 | 7/1988 | Langston. |
| 4,875,661 | 10/1989 | Langston. |
| 5,029,816 | 7/1991 | Langston. |

*Primary Examiner*—Robert C. Watson
*Attorney, Agent, or Firm*—Marger, Johnson, McCollom & Stolowitz

[57] ABSTRACT

An aerial cable installation method uses a series of large-diameter capstan winches, placed at intermediate access points along a conduit lashed to a strand stretched between a series of poles, to pull a long run of cable through the conduit. Each capstan winch is suspended at an access opening in the cable adjoining a pole from the strand and from the pole. The capstan winch has alignment arms for supporting opposite portions of the conduit in tangential alignment with capstan wheel and guiding the cable on and off the wheel without overlapping. The conduit includes a slidable sleeve which encloses the cable within the access opening after cable is capstanned into the conduit. The slidable sleeve may be fixedly connected to the main conduit at one end but remains slidable at the opposite end to permit movement including expansion and contraction of the cable in the conduit.

25 Claims, 4 Drawing Sheets

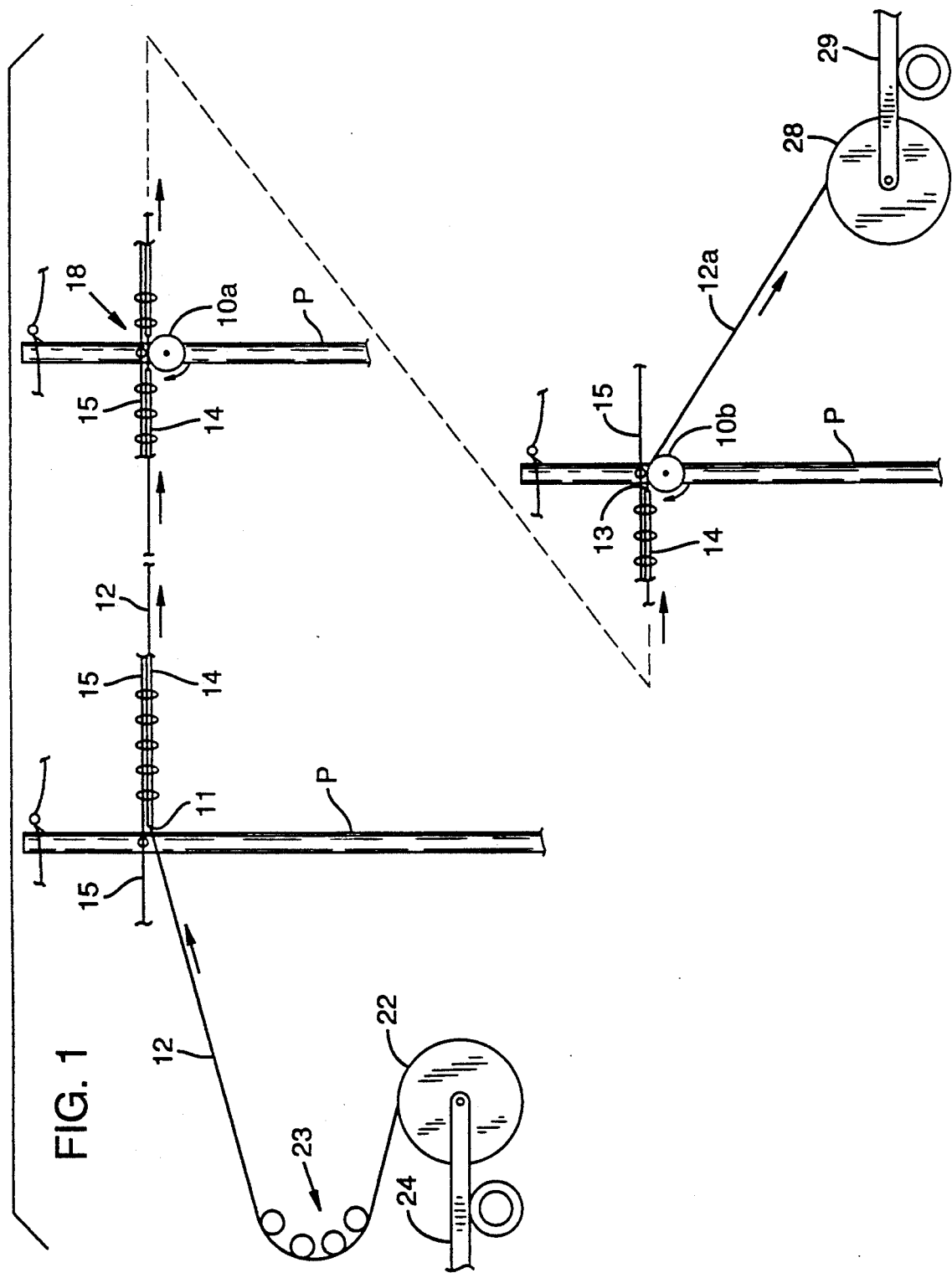

APPARATUS FOR AERIAL INSTALLATION OF CABLE IN INTERDUCT

BACKGROUND OF THE INVENTION

This invention relates to method and apparatus for installing of cables on poles through aerial conduit, and more particularly to aerial installation of long runs fiber optic, television and other communication cables.

Applicant R. C. Langston has previously been granted U.S. Pat. Nos. 5,029,816; 4,875,661; 4,757,976; 4,669,705 and 4,576,362 on methods and apparatus for installation of fiber optic and other forms of cable in underground conduit, using a novel system of large-diameter narrow capstan assist winches to relay long runs of cable through conduit with minimal splicing and risk of damage to the cable. The teachings of these patents are incorporated by reference herein and are improved upon and specially adapted, as disclosed herein, for aerial installation of long runs of cables in conduit on poles.

In the prior art, the difficulties of aerial installation of cable on poles include lashing the cable to metal strand with metal wires; kinking or over-bending the cable; and inability to handle long runs of cable. Commonly, the cables are installed on existing power poles which have a longer spacing than between or telephone poles. The poles are often unequally spaced and often are positioned out of a straight line so that the cable must bend around angles including 45 and 90 degree angles. The power companies prefer that any communication cable hung on their poles sag in the same manner as the power lines.

Lashing the cable to metal strand with metal wires does not allow the cable to move adequately and to adjust adequately to temperature changes. Conventional practice is to tension the strand as tightly as possible and then lash the cable to the metal strand without tension on the cable. This is inconsistent with power company wire-tensioning practices and runs the risk of the power lines and supporting strand contacting the communication cable as temperature changes vary the relative sags of the lines. Conventional methods of connecting cable to poles, by lashing the cable to the strand which is affixed by bolts to the poles, does not permit the cable to move lengthwise with temperature changes and can cause kinking or over-bending of the cable at 45 to 90 degree bends.

In an attempt to solve these problems, others have tried to use interduct or conduit to contain and support the cables by lashing the interduct to the metal strands. This approach introduces a new set of problems, including difficulties in installation, cable freezing problems, and the need for more splices in the cable than in the prior metal wire lashing techniques. At the same time, it does not really solve the problems of stretching, kinking or over-bending the cable.

The current method of installing cable in interduct or conduit is to split the interduct lengthwise and insert the cable in the interduct using a special tool as the cable and interduct are fed off of adjacent reels mounted on service truck. Meanwhile an aerial lift on the truck carries the combined cable/interduct upward over rollers onto the poles to be lashed to the strand. The first problem arises when an obstacle is encountered, such as a down guy wire or telephone or TV line drop or a power drop to an underground feed, that does not allow the truck and combined cable/interduct to pass. In this case, either the reels must be lifted over the obstacle using a crane or the combined cable/interduct must be cut and respliced around the obstacle. Both of these alternatives are time-consuming and expensive. Splicing is the most common approach but adds to dB losses in the cable and presents a point of probably future problems in cable operation. It would be preferable to be able to install long unbroken runs of cable in aerial conduit.

The conventional method of aerial installation of combined cable/interduct risks damage to the cable by over-bending or kinking it both during installation, as the combined cable/interduct is allowed to sag as it is being strung, and also on a continuing basis once it is strung and lashed onto strand where it must make a 45 to 90 degree bend at a pole. The interduct provides some protection to cable as it is installed but is not sufficient alone to prevent over-bending of the cable where it makes a bend when mounted on a pole. This especially increases the risk of damage to fiber optic cable. When the combined cable/interduct is bent at an angle, the cable is stretched taut at the bend and binds in the bend in the interduct so that it cannot move freely to accommodate temperature changes. Over time this will stress and ultimately damage the cable, particularly in the case of fiber optic cable.

Previously, others have installed aerial cable in unsplit interduct by pulling relatively short lengths (5,000 to 8,000 feet) of cable into the interduct using a conventional end puller. This approach has the drawback of requiring too many splices and is slower than the split interduct method. Another little recognized problem is that the interduct can admit water and condensate at its ends which, if frozen, could damage the cable. Consequently, the approach of pulling cable into unsplit interduct has not been widely used. As previously used, this approach does not solve the bending and movement problems.

Accordingly, there remains a need for a better way to quickly and efficiently install long runs of aerial cable on poles and the like.

SUMMARY OF THE INVENTION

An object, therefore, of the present invention is to improve upon present methods of installing aerial cable in conduit.

A second object is to facilitate longer aerial cable runs while minimizing problems due to binding at bends and due to temperature-induced movement.

A third object is to avoid problems of water collecting in the conduit.

An aerial cable installation according to the present invention uses a series of large-diameter capstan winches, placed at intermediate access points along a conduit lashed to a strand stretched between a series of poles, to pull a long run of cable through the conduit. Each capstan winch is suspended at an access opening in the cable adjoining a pole from the strand and from the pole. The capstan winch has alignment arms for supporting opposite end portions of the conduit in tangential alignment with capstan wheel and guiding the cable on and off the wheel without overlapping. The conduit includes a slidable sleeve which encloses the cable within the access opening after cable is capstanned into the conduit. The slidable sleeve may be fixedly connected to the main conduit at one end but remains slidable at the opposite end to permit relative movement of the cable and conduit.

This approach enables installation of very long, continuous runs (5 km or more) of cable without splices. The slidable sleeve permits movement of the cable, including expansion and contraction of the cable in the conduit, and controls bending of the cable around angles. These advantages make this approach especially useful for stringing fiber optic cable but the approach is also useful for coaxial and other forms of telecommunications cable.

The foregoing and other objects, features and advantages of the invention will become more apparent from the following detailed description of a preferred embodiment which proceeds with reference to the accompanying drawings.

BRIEF DESCRIPTION OF THE DRAWINGS

FIG. 1 is a schematic view of a system in accordance with the invention for pulling fiber optic cable through an aerial conduit.

DETAILED DESCRIPTION

General Arrangement

Figure 3:
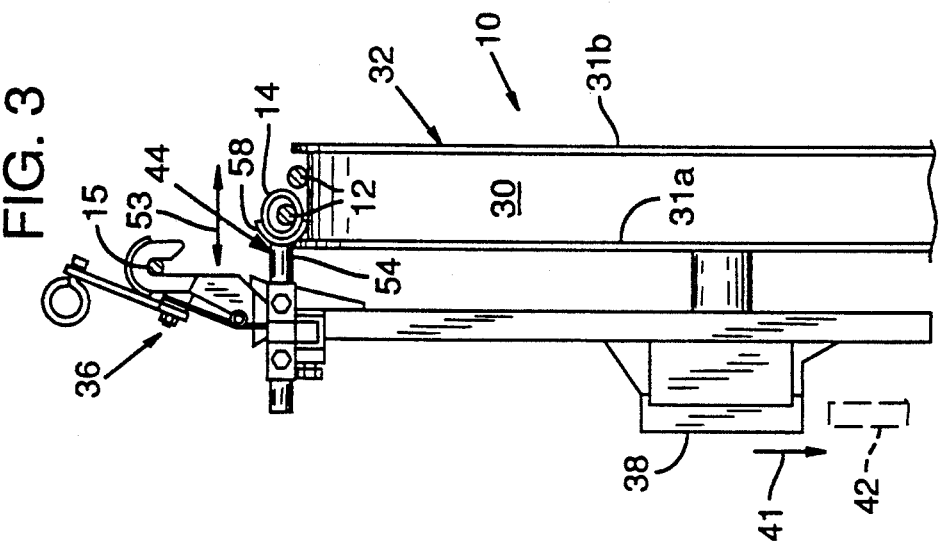
FIG. 3 is a side elevational view of the capstan winch of FIG. 2, with incoming and outgoing portions of the cable shown in cross section.

Referring to FIG. 1, the invention uses a series of capstan winches 10a, 10b to pull one or more cables 12 through an aerial interduct or conduit 14 from entry point 11 to an exit point 13. The conduit is lashed to a metal wire strand 15 stretched between poles P. At selected poles, the conduit 14 is cut to provide an intermediate access opening 18 for the capstan winch 10a to relay the cable downstream through the conduit. A cable reel 22 from which cable 12 is pulled is positioned near entry point 11 on a trailer or truck 24 and is raised to the elevation of the poles by a conventional roller assembly 23 mounted on the truck. At conduit exit 13, a capstan wheel 10b relays the pull rope 12a downward as it is pulled through and out of the conduit 14 to a take-up reel 28 on a second trailer or truck 29 adjacent the exit point. Each capstan winch 10 is powered independently to permit their placement at optimally spaced intermediate access openings 18. The winches 10a, 10b are constructed and each separately controlled as described in the aforementioned Langston patents to pull the pull rope 12a and a long run of cable 12 at several points along the conduit 14 simultaneously.

Figure 2:
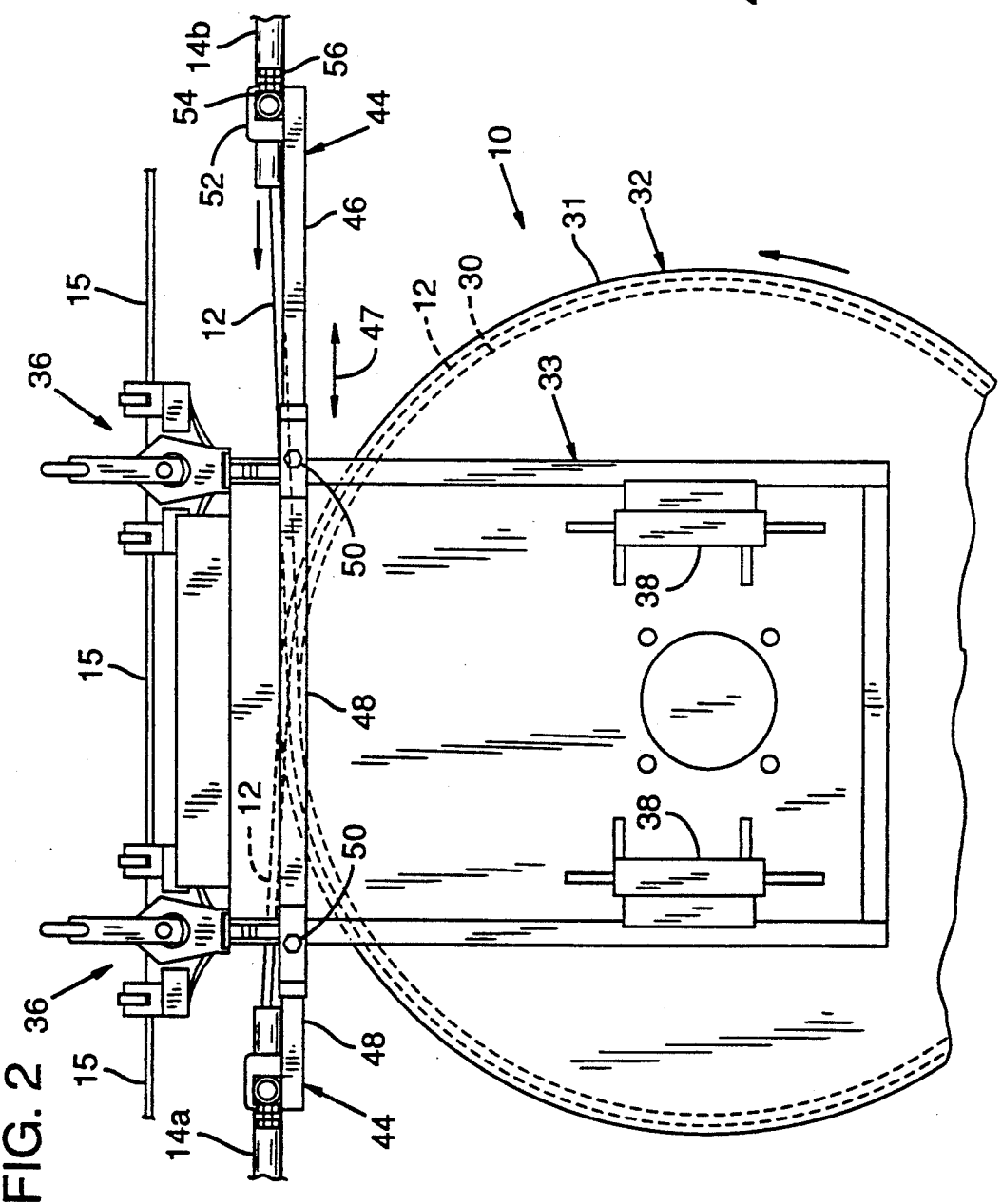
FIG. 2 is a rear elevation view of a capstan winch used in the system of FIG. 1, with the gear box and hydraulic drive motor removed to show details of the support bracket.

Referring to FIGS. 2 and 3, the capstan winch 10 pulls the cable by continuously winding a couple of cable coils on and off the circumferential surface 30 of a narrow, flanged wheel or drum 32 as the wheel turns. The wheel radius is preferably sized to produce a wheel curvature large enough to avoid bending fiber optic cable beyond its bending limit, normally specified by the cable manufacturer as a minimum bending radius. Interchangeable wheels with diameters of 18, 24, 30 and 36 inches are used to capstan cables of various common sizes. Wheel width between flanges 31 is sized to the diameter and number of cables or cable windings to be wrapped around the wheel with just sufficient margin to allow reversal.

Figure 5:
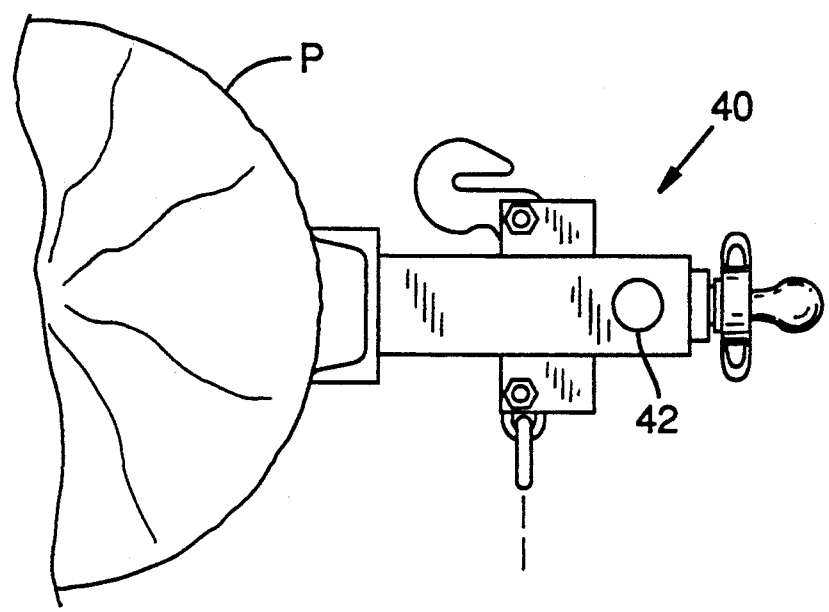
FIG. 5 is a top plan view of the Jackson bracket of FIG. 4.
Figure 4:
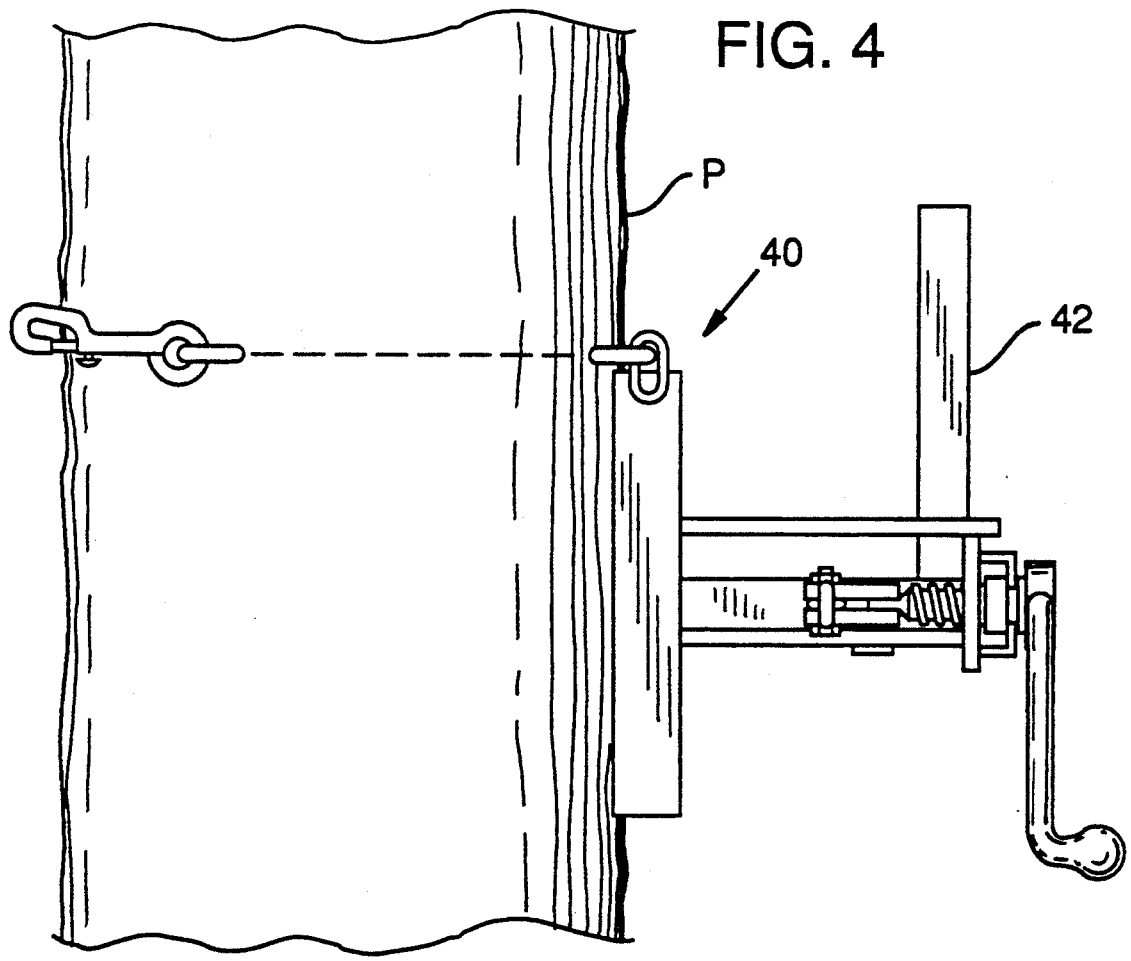
FIG. 4 is a side elevation view of a Jackson bracket positioned on a pole.
Figure 6:
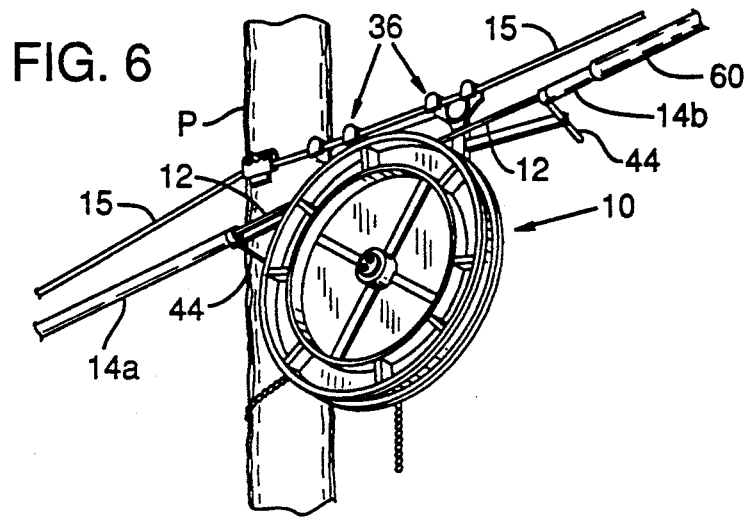
FIG. 6 is a side elevation view of a pole and intermediate access opening with a capstan winch positioned between open end portions 14a, 14b of the conduit with a pull rope or cable extending through the open ends of the conduit and wrapped around the capstan wheel for relaying toward the conduit exit.

A winch bracket 33 formed by a flat rectangular plate 35 supports the capstan wheel 32 and its prime mover (preferably a hydraulic drive motor and reduction gearbox, not shown) so that wheel 32 can turn in a circumferential plane parallel to the bracket. Mounted atop bracket 33 are a pair of conventional strand hangers 36 for suspending the winch support plate from the strand 15 with the support plate and the circumferential plane of the capstan wheel parallel to the strand. The strand hangers are spaced apart, e.g., 20 inches, along the strand and are secured against movement lengthwise alone the strand either by a clamping mechanism built into the strand hangers or by clamps bolted to the strand at opposite ends of the strand hangers (see FIG. 6). Mounted on the backside of the bracket are a pair of vertical sleeves 38 each sized to receive a vertical pin 42 of a conventional Jackson pole support bracket 40 (see FIGS. 4 and 5) as indicated by arrow 41 in FIG. 3. This arrangement supports the winch bracket 33 and capstan assist winch prime mover and flanged wheel 32 at least in part from the pole and aids in resisting rotation of the winch bracket axially of the capstan wheel while capstanning the cable. The sleeves 38 are spaced apart to permit mounting winch bracket 33 in a laterally offset position on either side of a pole. FIG. 6 shows the winch bracket and capstan located on a downstream side of the pole P.

Alignments arms 44 are mounted on the winch bracket below the strand hangers for aligning opposite end portions 14a, 14b of the conduit tangentially with the circumferential surface 30 of the flanged capstan wheel 32. The alignment arms each include a rectangular or square cross-section tube 46 which is slidable received in a sleeve 48 of like cross-section so as to be extensible lengthwise across the access opening and locked by set screws 50. Sleeve 48 is positioned to be tangential to the circumferential surface of the capstan wheel. Mounted on the distal end of each tube 46 is another sleeve 52 oriented to receive a circular tube 54 at a right angle to tube 46 and a set screw 56. The distal end of each tube 54, in turn has a U-shaped receptacle 58 sized to hold the conduit. The conduit is secured in receptacle 58 by hose clamps, tape, or other means (not shown). In use, the arms are extended lengthwise, as indicated by arrow 47 as far as needed to meet the ends of the conduit without interference from the adjacent pole. Then the receptacles 58 are positioned by extending sleeves 52 as indicated by arrow 53 so that the incoming side of the cable enters the flanged capstan wheel surface nearer one flange 31a and the outgoing side exit nearer the opposite flange 31b.

The following describes the installation method and the intermediate access opening closure sleeve assembly of the present invention.

The method of aerial installation of cable 12 in a conduit 14 and mounting the combined cable and conduit 12, 14 on a series of spaced poles P begins by affixing a strand to the poles and stretching the strand to a predetermined tension between the poles. This is usually done in conformity with power company requirements. A length of unsplit conduit is lashed onto the strand using conventional lashing methods. The conduit has open ends defining an entry and an exit openings 11, 13. The conduit is cut into segments such as segments each having open end portions 14a, 14b at one or more intermediate access locations along the length of the conduit. These access openings are formed wherever it is convenient to place a capstan assist winch and the apex of any angles of 20 degrees or more in the line of the poles and strand. A pull rope is extended from the conduit entry 11 through the conduit 14 and each intermediate access location 18 to the conduit exit 13. An end pulling winch or a take-up reel 28 and capstan assist winch 10b are placed at the conduit exit, for pulling the pull rope and cable through the final downstream segment of the conduit. One end of the pull rope is connected to the lead end of the cable 12 located at the conduit entry and an opposite end of the pull rope is connected to the end pulling winch or take up reel.

An intermediate capstan winch is suspended from the strand by hooking the strand hangers of the winch support bracket over the strand and is supportably connected by a Jackson support bracket or the like to the adjacent pole at selected intermediate access points for pulling the cable through each segment of the conduit. The spacing between capstan assist winches varies with number of bends and conduit and cable diameter but typically ranges from 4000 to 8000. feet. At least one wrap, preferably about three, of an intermediate portion of the pull rope are wound around the circumferential cable engagement surface 30 of the flanged capstan wheel 32 at the intermediate access locations. The open ends of the conduit portions at each intermediate access location are tangentially aligned with the circumferential cable engagement surface of the capstan wheel. Then the winches are simultaneously operated to pull the rope and thereby the cable through the conduit.

The open ends of the conduit are aligned tangentially with the circumferential cable engagement surface of the capstan wheel by supporting the open ends of the conduit on alignment brackets mounted on the winch support bracket. The alignment brackets are extending lengthwise along the strand to align the conduit ends with the cable engagement surface. The alignment brackets are adjusted in a direction normal to the strand to position the incoming side of the cable alongside one flange 31a of the capstan wheel and to position the outgoing side of the cable alongside an opposite flange 31b of the capstan wheel so that the incoming and outgoing sides of the cable do not overlap as they pass through each access opening.

Figure 7:
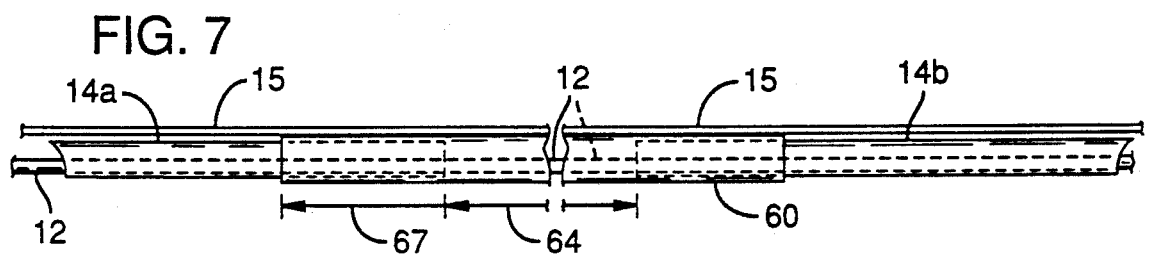
FIG. 7 is a side elevation view showing the access opening with a conduit closure extending across the access opening, interior details being shown in dashed lines.
Figure 8:
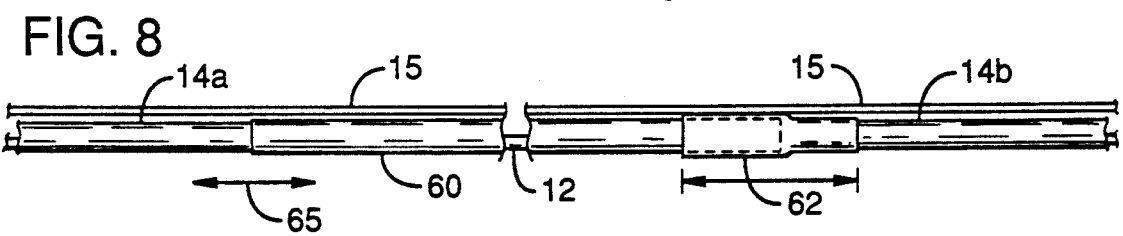
FIG. 8 is a side elevation view like FIG. 7 showing the access opening assembly after installation of a heat-shrink sleeve at one end of the conduit closure sleeve.

The intermediate access openings 18 are set up for closure by fitting a segment of conduit 60 sized to fit over the conduit 14 as a slidable sleeve over one of the open end portions 14b of the conduit at each intermediate access location before connecting the pull rope across the access opening. After pulling the cable and removing the winch, closure is completed by sliding the sleeve over both open end portions of the conduit to slidably enclose the cable as shown in FIG. 7. It is not essential to further close the access opening but is preferred to secure the conduit segment 60 to cable 14 at on end. This can be done by taping the sleeve joint but is preferably done by fitting a sleeve 62 of heat-shrinkable material over the conduit portion 14b and one end of the slidable sleeve 60, before connecting the pull rope and pulling the cable. A suitable length of the heat shrink sleeve is about 12 inches. A suitable sleeve material is Raychem FCSM 51/16. The sleeve material is heat-shrunk over the one end of the slidable sleeve to seal such end when the access opening is closed. The end portion 14b of the conduit which is nonslidably connected to the sleeve 60 is lashed to the strand while leaving the slidable sleeve disconnected from the strand where it overlaps conduit end portion 14a. This arrangement permits lengthwise movement as indicated by arrow 65. When the access opening is cut in a straight run of conduit, the length of the access opening, indicated by arrow 64, is typically about 3 feet. The sleeve 60 is cut to about 6 feet to provide about 18 inches of overlap, indicated by reference numeral 67.

Figure 9:
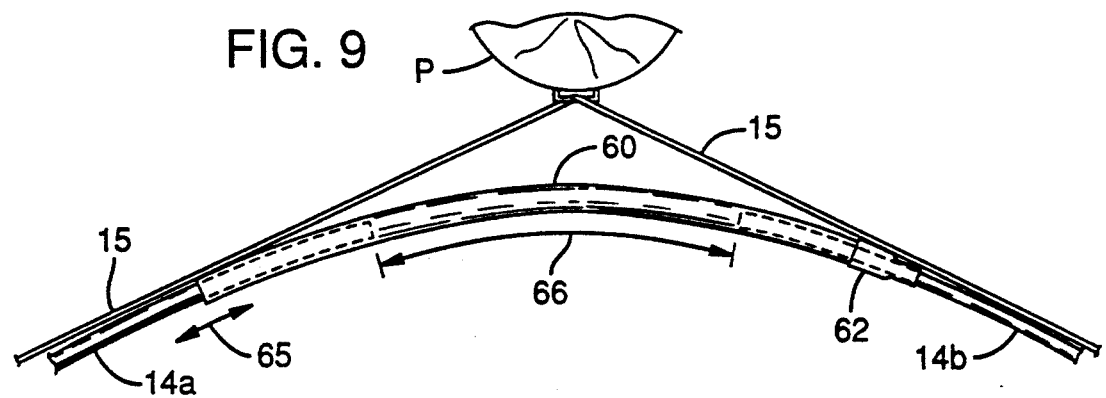
FIG. 9 is a top view showing an angular access opening assembly at an access opening formed at the apex of an angle in the line of poles.

When one of the intermediate access locations is at an angular bend in the cable, as shown in FIG. 9, the conduit is cut to form an access opening 18 to 24 inches long. The slidable sleeve in this case is cut to a longer length, e.g., 8 feet to slidably enclose a substantial length, e.g., about 3 feet, of the conduit end portions. This structure reinforces the conduit 14 and thereby encloses the cable within an arc 66 of extended radius along the angular bend. A tubular seal 62 can be fitted over one end portion of the conduit and over one end of the slidable sleeve, as described above.

Preferably, installation is completed by perforating the conduit at selected locations along its length to provide small openings at least at a location intermediate the poles to permit drainage of water. The openings are preferably located along the lower side of the conduit.

A variation on the foregoing method is used for splicing conduit segments together without a slip joint, e.g. for connecting the ends of two spools of interduct so that the joint can withstand substantial tension and present low friction to the pulling of pull rope and cable. It is also sufficiently gas-tight to use for natural gas piping. This method is to place the ends of the conduit segments coaxially end-to-end with a heat shrinkable sleeve over one end portion; wrap a layer of suitable woven material around the end-to-end joint; slide the heat shrinkable sleeve over the joint and woven material; and heat shrink the heat shrinkable sleeve around the joint. Suitable woven fabric materials include woven fiber glass, woven metal and woven Kevlar.

Another variation on the method of aerial installation of a cable in conduit leaves the cable exposed at intermediate access openings adjacent poles. After affixing a strand to the poles; stretching the strand and lashing a length of unsplit first conduit on the strand, the conduit is cut into at least two segments with end portions spaced apart within the access opening on opposite sides of the pole. The cable is then pulled through each segment of the conduit and across the intermediate access opening. Then, the two end portions of the conduit are resiliently coupled to the adjacent pole, e.g., by means of coil springs, with a slack portion of the cable between the coupled portions to permit movement of the conduit as well as expansion and contraction of the cable within the conduit.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method of aerial installation of cable in a conduit and mounting the combined cable and conduit on a series of spaced poles, the method comprising:
   affixing a strand to the poles and stretching the strand to a predetermined tension between the poles;
   lashing a length of unsplit conduit on the strand, the conduit having ends defining an entry and an exit;
   cutting the conduit into segments having open ends at one or more intermediate access locations along the length of the conduit;
   placing an end pulling winch at the conduit exit, for pulling the cable through the conduit;
   extending a pull rope from the conduit entry through the conduit and each intermediate access location to the conduit exit; and
   connecting one end of said pull rope to the lead end of a cable located at the conduit entry and an opposite end thereof to the end pulling winch;
   suspending an intermediate capstan winch from the strand and connecting the winch to an adjacent pole at each intermediate access point for pulling the cable through each segment of the conduit, the capstan winch including a flanged capstan wheel having a circumferential cable engagement surface;
   winding at least one wrap of an intermediate portion of the pull rope around the capstan wheel at the intermediate access location;
   align the open ends of the conduit at each intermediate access location tangentially with the circumferential cable engagement surface of the capstan wheel; and
   simultaneously operating each winch to pull the rope and thereby the cable through the conduit.

2. A method according to claim 1 in which the intermediate capstan winch is suspended from the strand by hooking a support bracket on which the capstan winch is mounted over the strand.

3. A method according to claim 1 in which the intermediate capstan winch is connected to the pole by mounting a support bracket on which the capstan winch is mounted on a pole bracket affixed to the pole.

4. A method according to claim 1 in which the open ends of the conduit are aligned tangentially with the circumferential cable engagement surface of the capstan wheel by supporting the open ends of the conduit on alignment brackets mounted on a support bracket on which the capstan winch is mounted.

5. A method according to claim 4 including extending the alignment brackets lengthwise along the strand to align the conduit ends with the cable engagement surface.

6. A method according to claim 4 including adjusting the alignment brackets in a direction normal to the strand to position an incoming side of the cable alongside one flange of the capstan wheel and to position an outgoing side of the cable alongside an opposite flange of the capstan wheel so that the incoming and outgoing sides of the cable do not overlap.

7. A method according to claim 1 in which cutting the conduit into segments includes fitting a segment of conduit sized to fit over the conduit as a slidable sleeve over one of the open ends of the conduit at each intermediate access location and, after pulling the cable, removing the winch and sliding the sleeve over the open ends of the conduit at each intermediate access location to slidably enclose the cable.

8. A method according to claim 7 including fitting a length of heat-shrinkable sleeve material over the conduit and one end of the slidable sleeve before pulling the cable and shrinking the heat-shrinkable sleeve material over said one end of the slidable sleeve to seal said one end.

9. A method according to claim 8 including lashing said one end of the conduit to the strand while leaving the slidable sleeve disconnected from the strand.

10. A method according to claim 7 in which cutting the conduit into segments includes locating one of said intermediate access locations at an angular bend in the cable and positioning the slidable sleeve to slidably enclose the cable and one of the conduit ends within an arc of extended radius along said angular bend.

11. A method of aerial installation of a cable in conduit on a series of spaced poles, the method comprising:
    affixing a strand to the poles and stretching the strand to a predetermined tension between the poles;
    lashing a length of unsplit first conduit on the strand, the conduit having ends defining an entry and an exit;
    cutting the first conduit into at least two segments each having an open end at an intermediate access location spaced along the length of the conduit;
    fitting a segment of second conduit sized to fit within or over the first conduit as a slidable sleeve overlapping one of the open ends of the first conduit at the intermediate access location;
    pulling the cable through each segment of the conduit;
    sliding the sleeve over the open ends of the conduit at each intermediate access location to slidably enclose the cable.

12. A method according to claim 11 including lashing one of said ends of the first conduit to the strand while leaving the slidable sleeve disconnected from the strand.

13. A method according to claim 12 including fitting a length of heat-shrinkable sleeve material over one end of the first conduit and over said one end of the slidable sleeve before pulling the cable and shrinking the heat-shrinkable sleeve material over said one end of the slidable sleeve to seal said one end.

14. A method according to claim 11 in which cutting the conduit into segments includes locating the intermediate access location at an angular bend in the cable and positioning the slidable sleeve to slidably enclose the cable and one of the conduit ends within an arc of extended radius along said angular bend.

15. A method of aerial installation of a cable in conduit on a series of spaced poles, the method comprising:
    affixing a strand to the poles and stretching the strand to a predetermined tension between the poles;
    lashing a length of unsplit first conduit on the strand, the conduit having ends defining an entry and an exit;

cutting the first conduit into at least two segments each having an open end at an intermediate access location spaced along the length of the conduit;

pulling the cable through each segment of the conduit and across the intermediate access opening; and resiliently coupling to a pole two portions of the cable spaced apart within the access opening on opposite sides of the pole with a slack portion of the cable between said coupled portions to permit movement including expansion and contraction of the cable within the conduit.

16. An aerial installation arrangement of cable in conduit on a series of spaced poles, the installation arrangement comprising:

a strand affixed to the poles and stretched to a predetermined tension between the poles;

a length of unsplit first conduit lashed lengthwise along the strand, the conduit having ends defining an entry and an exit;

an intermediate access opening dividing the first conduit into at least two segments each having an open end portion at the access opening, the access opening being located along a length of the first conduit adjoining one of the poles;

a segment of second conduit sized to fit as a slidable sleeve over or within the first conduit, the segment of second conduit fitted over or within the open end portions of the first conduit and spanning the intermediate access opening; and a cable extending through each segment of the first conduit and enclosed by the segment of second conduit at the intermediate access opening;

the open end portions of the first conduit being separately lashed to the strand and the second conduit segment being slidable relative to at least one of the open end portions of the first conduit to permit movement at the intermediate access opening including lengthwise expansion and contraction of the cable within the conduits.

17. An installation arrangement according to claim 16 including a tubular seal fitted over one end portion of the first conduit and over one end of the slidable sleeve.

18. An installation arrangement according to claim 16 in which the first conduit includes small openings at least at a location intermediate the poles to permit drainage of water.

19. Apparatus for aerial installation of cable in a conduit and mounting the combined cable and conduit on a strand stretched between a series of spaced poles, the apparatus comprising:

a capstan assist winch including a flanged capstan wheel having a circumferential cable engagement surface for capstanning the cable through an intermediate access opening in the cable;

a winch support plate mounting the capstan assist winch for rotation of the capstan wheel in a circumferential plane parallel to the support plate;

first means for suspending the winch support plate from the strand with the support plate and the circumferential plane of the capstan wheel parallel to the strand; and second means mountable on one of the poles for supporting the support plate and capstan assist winch at least in part from the pole and resisting rotation of the support plate axially of the capstan wheel while capstanning the cable.

20. Apparatus according to claim 19 in which the support plate includes conduit alignment arms extending tangentially of the circumferential cable engagement surface of the capstan wheel and generally parallel to the strand for supporting open end portions of the conduit in tangential alignment with the circumferential cable engagement surface of the capstan wheel.

21. Apparatus according to claim 20 in which the conduit alignment arms are extensible lengthwise to adjust to different lengths of access openings.

22. Apparatus according to claim 20 in which the conduit alignment arms are adjustable axially of the capstan wheel to position the open end portions of the conduit relative to side flanges of the capstan wheel.

23. Apparatus according to claim 20 in which the conduit alignment arms are positioned axially of the capstan wheel to position one of the open end portions of the conduit adjacent one side flange of the capstan wheel and to position the opposite open end portion of the conduit adjacent an opposite side flange of the capstan wheel.

24. Apparatus according to claim 19 in which the first means includes a pair of strand hangers spaced apart along the winch support plate.

25. Apparatus according to claim 19 in which the second means includes a pole support bracket having a vertical pin and a vertical sleeve mounted on the winch support plate for receiving the vertical pin.

* * * * *